US012482958B2

(12) United States Patent
Chen et al.

(10) Patent No.: US 12,482,958 B2
(45) Date of Patent: Nov. 25, 2025

(54) CONNECTING TERMINAL AND A CONNECTING ASSEMBLY

(71) Applicant: Tyco Electronics (Shanghai) Co., Ltd., Shanghai (CN)

(72) Inventors: Bo (Leo) Chen, Shanghai (CN); Hongbo (Daniel) Zhang, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 595 days.

(21) Appl. No.: 17/901,914

(22) Filed: Sep. 2, 2022

(65) Prior Publication Data

US 2023/0073193 A1 Mar. 9, 2023

(30) Foreign Application Priority Data

Sep. 3, 2021 (CN) ......................... 202111031371.2

(51) Int. Cl.
*H01R 4/18* (2006.01)
*H01R 13/436* (2006.01)

(52) U.S. Cl.
CPC ......... *H01R 4/185* (2013.01); *H01R 13/4367* (2013.01)

(58) Field of Classification Search
CPC ............................ H01R 4/185; H01R 13/4367
See application file for complete search history.

(56) References Cited

U.S. PATENT DOCUMENTS

| | | | | | |
|---|---|---|---|---|---|
| 4,787,864 | A * | 11/1988 | Hunt, III | H01R 13/514 | 439/747 |
| 5,595,509 | A * | 1/1997 | Fry | H01R 13/4362 | 439/752 |
| 6,244,901 | B1 * | 6/2001 | Fujii | H01R 13/501 | 439/595 |
| 7,232,339 | B1 * | 6/2007 | Wilson | H01R 13/64 | 439/744 |
| 10,381,794 | B2 * | 8/2019 | Saito | H01R 43/058 | |
| 2004/0110427 | A1 * | 6/2004 | Shi | H01R 13/4367 | 439/752 |
| 2005/0112961 | A1 * | 5/2005 | Hayashi | H01R 4/185 | 439/877 |
| 2010/0120302 | A1 * | 5/2010 | Kumakura | H01R 4/185 | 439/878 |
| 2017/0294730 | A1 * | 10/2017 | Inaka | H01R 13/426 | |

(Continued)

*Primary Examiner* — Abdullah A Riyami
*Assistant Examiner* — Nelson R. Burgos-Guntin
(74) *Attorney, Agent, or Firm* — Barley Snyder

(57) ABSTRACT

The present invention provides a connecting terminal for connecting a wire, including: a body; a clip portion extending from both sides of the body and configured to hold a conductor of a wire; and a fixing part extending from both sides of the body, including: a clamping part configured to clamp an insulating layer of the wire; and a stopping part formed on the clamping part and configured to abut the terminal position assurance device to enable the connecting terminal to be fixed in the housing when the connecting terminal is mounted in the housing of the connecting assembly. Since the fixing part has both a clamping part for clamping the wire and a stopping part forming an appropriate height difference with the wire, the connecting terminal provided by the present invention becomes more compact and miniaturized.

19 Claims, 5 Drawing Sheets

(56) References Cited

U.S. PATENT DOCUMENTS

| | | | | |
|---|---|---|---|---|
| 2019/0006781 | A1 * | 1/2019 | Hung | H01R 13/4367 |
| 2019/0280398 | A1 * | 9/2019 | Xu | H01R 4/184 |
| 2019/0288436 | A1 * | 9/2019 | Soudy | H01R 13/428 |
| 2020/0227863 | A1 * | 7/2020 | Maesoba | H01R 4/185 |

* cited by examiner

CONNECTING TERMINAL AND A CONNECTING ASSEMBLY

CROSS-REFERENCE TO RELATED APPLICATIONS

This application claims the benefit of the filing date under 35 U.S.C. § 119(a)-(d) of Chinese Patent Application No. 202111031371.2, filed Sep. 3, 2021.

FIELD

The present invention relates to electrical connection technology, and more particularly, to a connecting terminal and a connecting assembly.

BACKGROUND

It generally requires a terminal position assurance device (TPA) to be assembled after a wire termination connector is mounted in a crimping terminal, to ensure that the crimping terminal is assembled in place. The TPA often abuts a front end of the terminal, or it needs an additional structure for the terminal to mate with the TPA, which makes it rather difficult for design of the TPA or the terminal, makes the TPA or the terminal larger-sized, and makes against miniaturization design for products.

SUMMARY

The present invention provides a connecting terminal for connecting a wire in one aspect, having: a body; a clip portion, the clip portion extending from both sides of the body and configured to hold a conductor of the wire; and a fixing part, the fixing part extending from both sides of the body, having: a clamping part, the clamping part configured to clamp an insulating layer of the wire; and a stopping part, the stopping part formed on the clamping part and configured to abut a terminal position assurance device to fix the connecting terminal in a housing of a connecting assembly when the connecting terminal is mounted in the housing.

Since the fixing part has both a clamping part for clamping the wire and a stopping part forming an appropriate height difference with the wire, the connecting terminal provided by the present invention makes products more compact and miniaturized.

DETAILED DESCRIPTION

Figure 1:
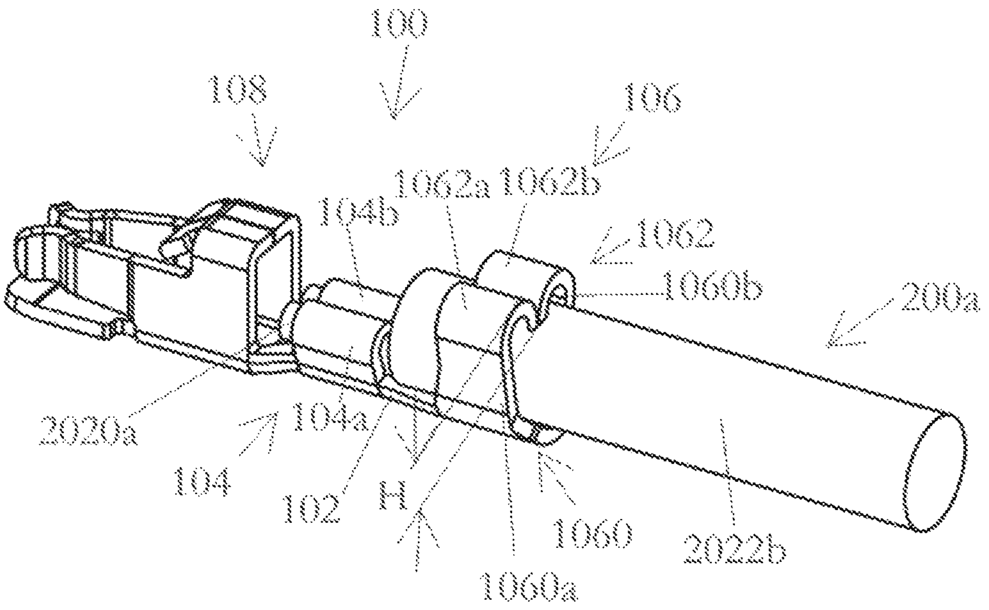
FIG. 1 is a perspective view of a connecting terminal forming a connection with a wire, according to an embodiment of the present invention.

In the detailed descriptions of the following preferred embodiments, reference will be made to the accompanying drawings which form a part of the present invention. The accompanying drawings show, by ways of examples, specific embodiments in which the present invention can be practiced. The exemplary embodiments are not intended to describe all embodiments in accordance with the present invention. In the specification, same or similar reference numerals refer to same or similar components. It can be understood that other embodiments may be utilized and structural changes may be made without departing from the scope of the present invention. Therefore, the following detailed description is not intended to be limiting, and the scope of the present invention is defined by the appended claims.

The terms "including", "comprising" and the like used herein, should be understood to mean open-ended terms, (i.e., meaning "comprising/including, but not limited to"), meaning that other contents may also be included. The term "one embodiment" means "at least one embodiment"; the term "another embodiment" means "at least one additional embodiment" and so on.

The present invention provides a detailed description of the embodiments of the present invention in conjunction with the drawings.

Figure 2:
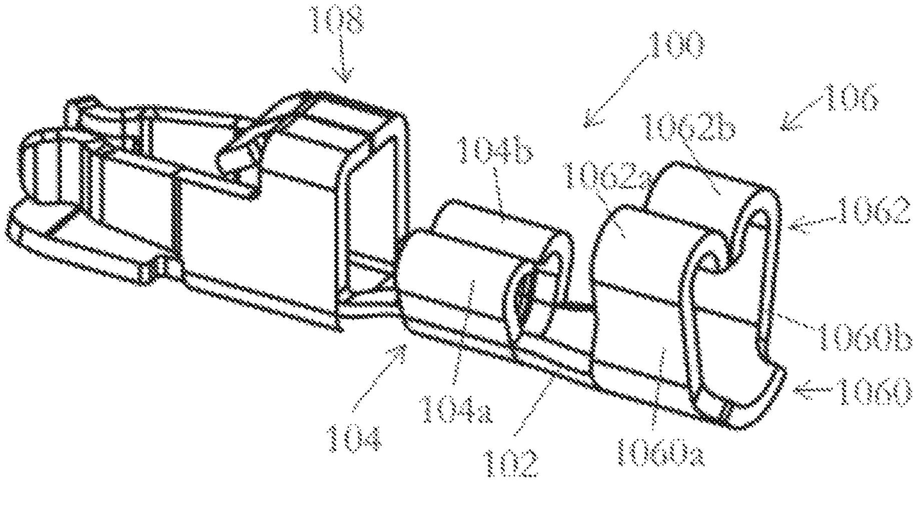
FIG. 2 is a perspective view of the connecting terminal of FIG. 1 without the wire.
Figure 3:
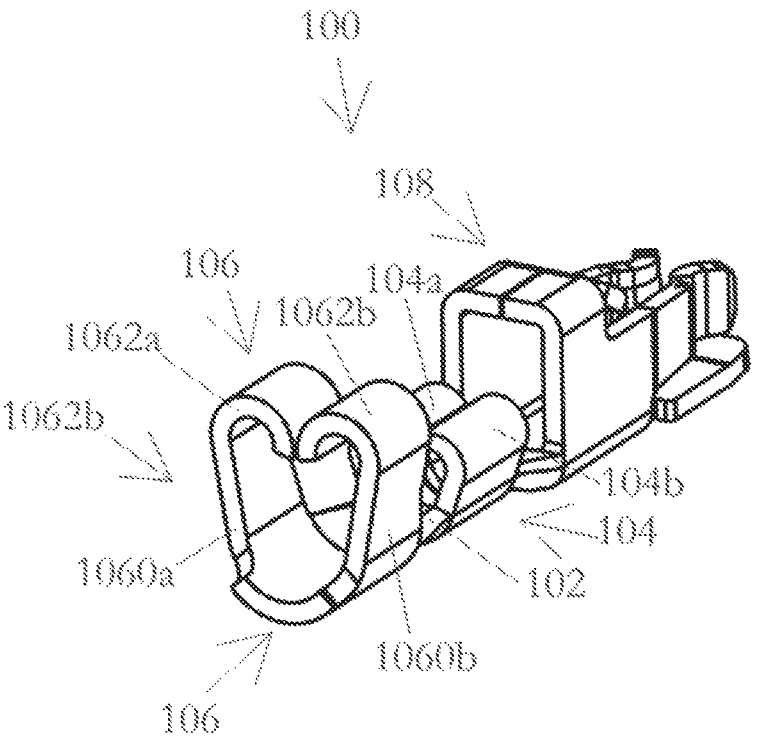
FIG. 3 is a view of the connecting terminal of FIG. 2 from another perspective.
Figure 4:
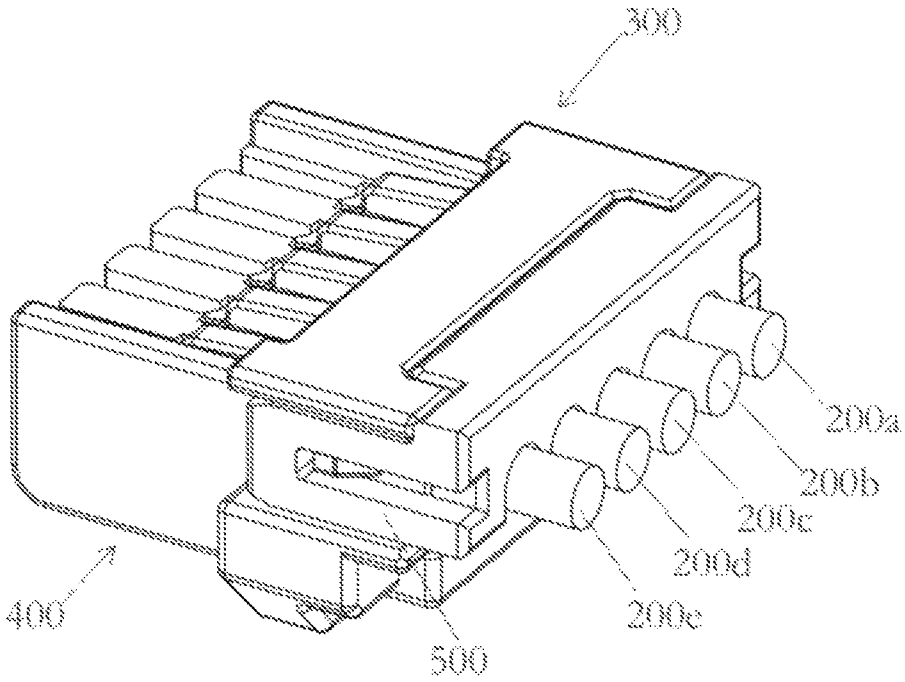
FIG. 4 is a perspective view of a connecting assembly after assembled, according to an embodiment of the present invention.
Figure 5:
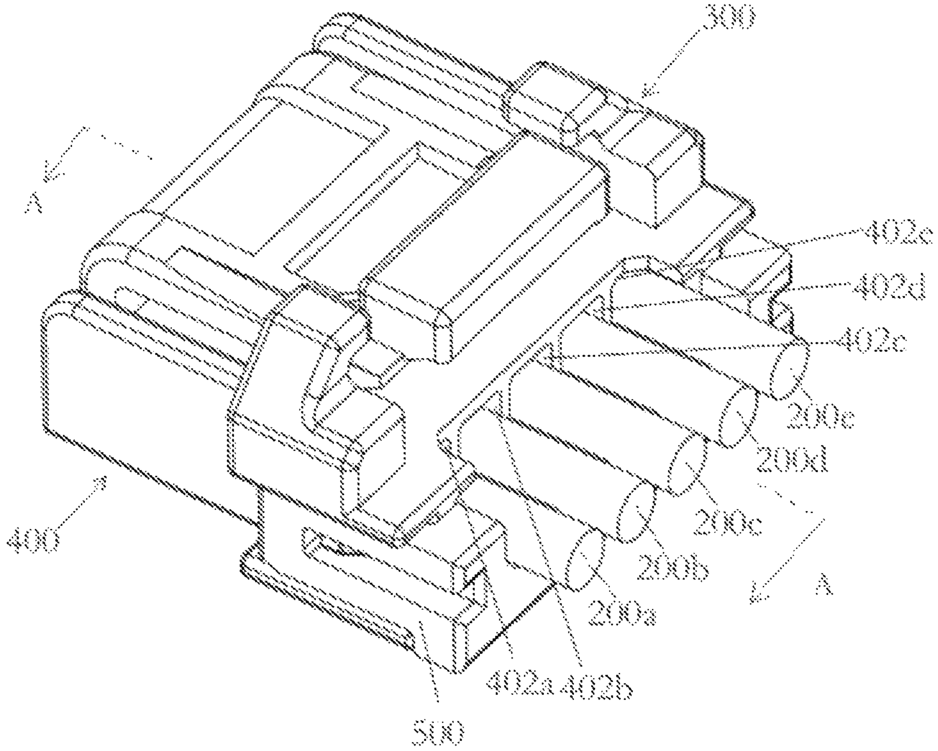
FIG. 5 is a view of the connecting assembly of FIG. 4 from another perspective.

In the present invention, the descriptions such as front, rear, left, right, up, down, left side, right side, longitudinal direction, transverse direction, etc., are all relative concepts used in accordance with FIG. 1 and FIG. 2.

Figure 6:
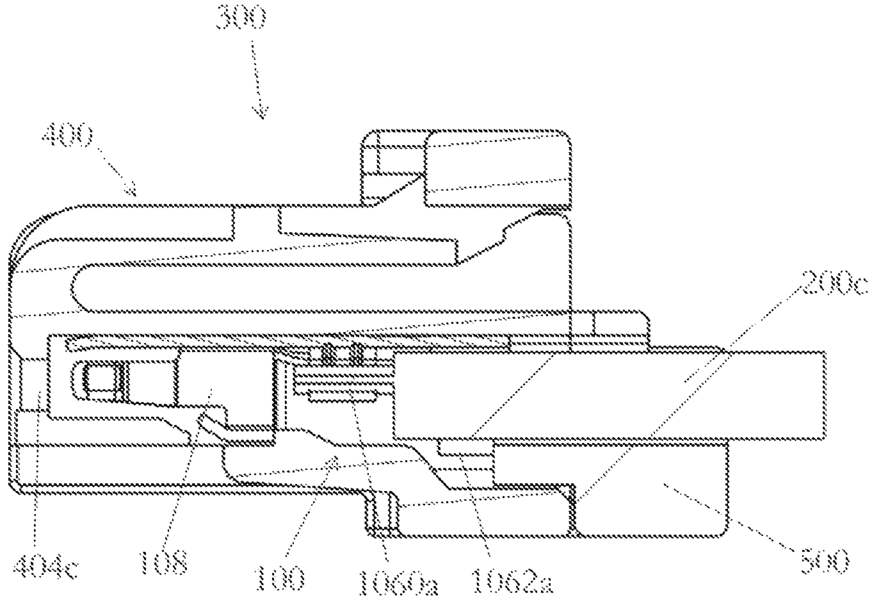
FIG. 6 is a cross-sectional view taken along the line A-A of FIG. 5.
Figure 7:
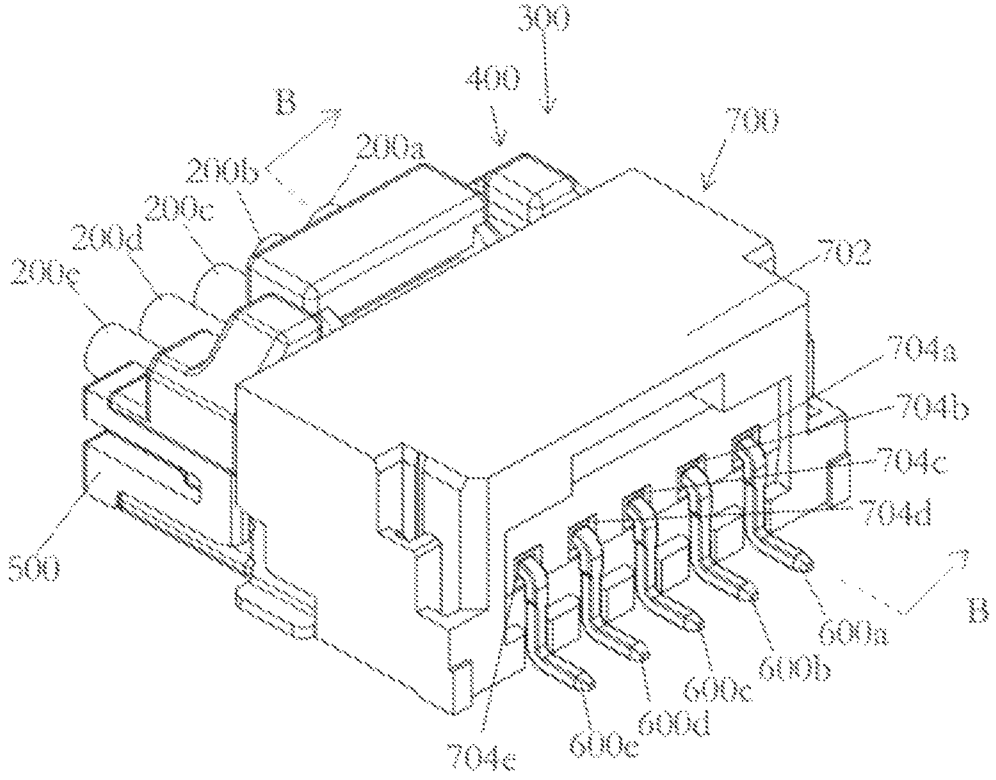
FIG. 7 is a perspective view of the connecting assembly of FIG. 5 after assembled with a mating connection assembly
Figure 8:
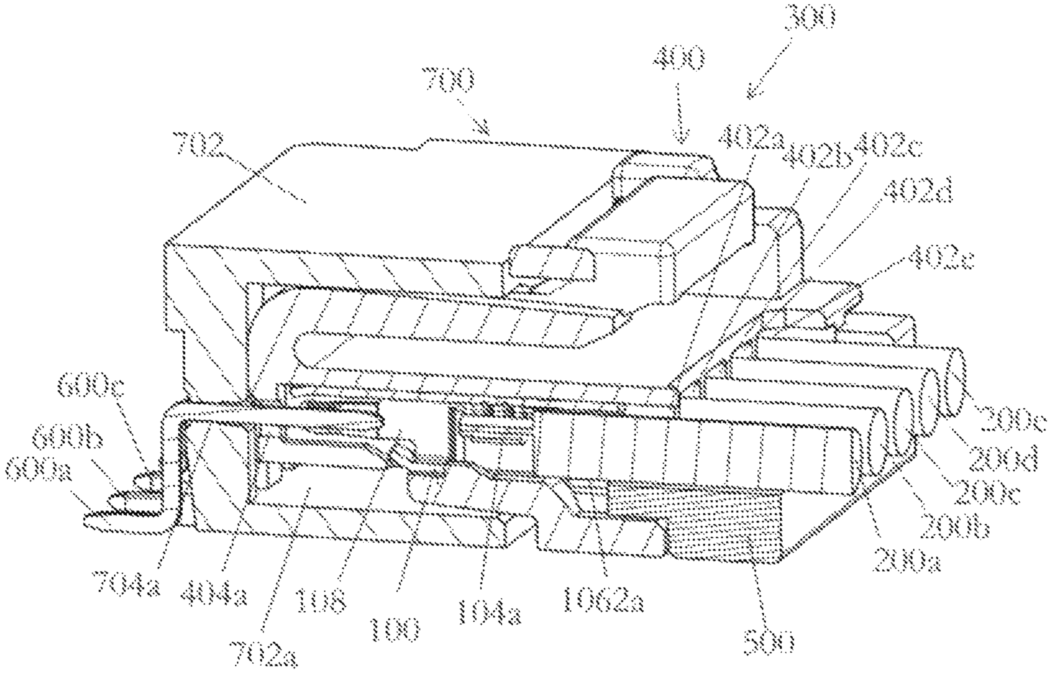
FIG. 8 is a cross-sectional view taken along the line B-B of FIG. 7.
Figure 9:
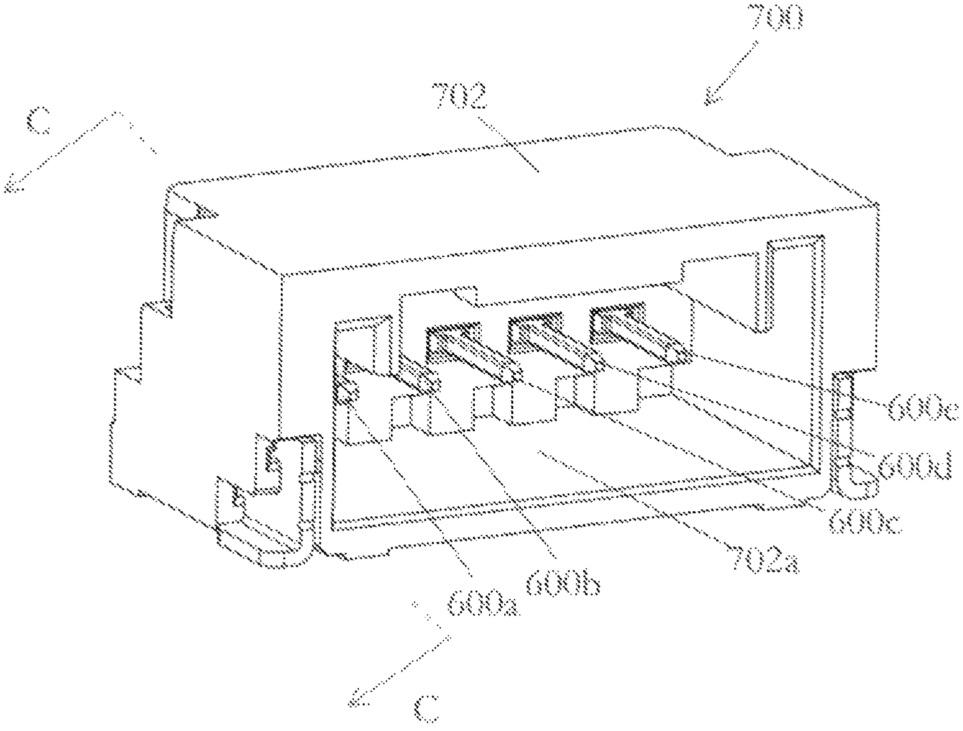
FIG. 9 is a perspective view of the mating assembly in FIG. 7.
Figure 10:
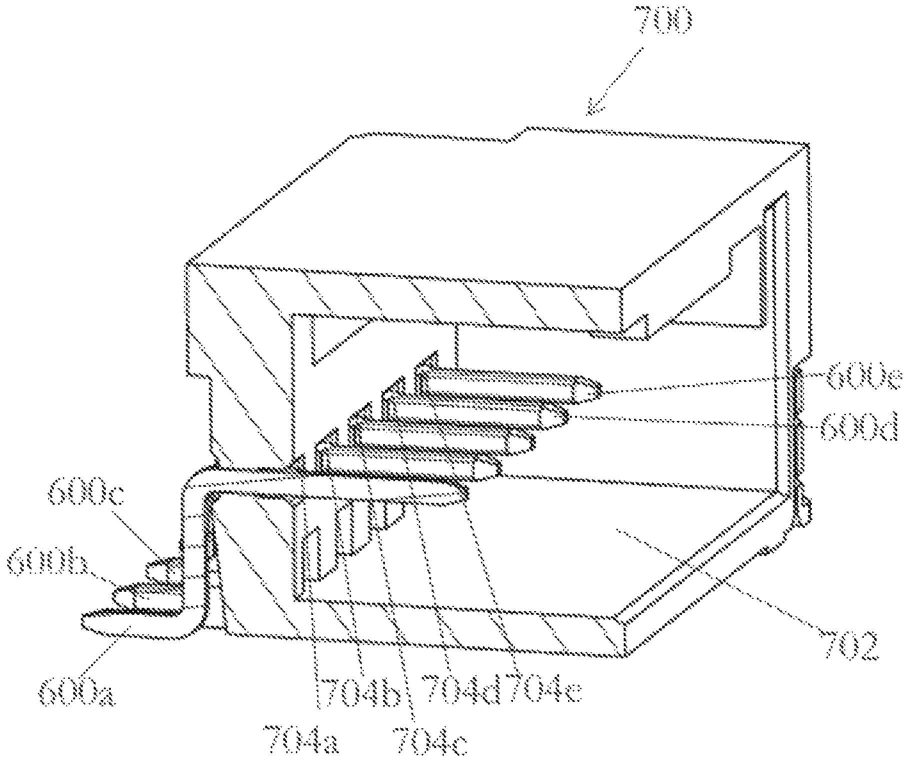
FIG. 10 is a perspective view taken along the line C-C of FIG. 9.

As shown in FIG. 1-FIG. 6 and FIG. 8, a connecting assembly 300 comprises five connecting terminals 100, a housing 400 and a terminal position assurance device 500. Disposed within the housing 400 are accommodating cavities (402*a*, 402*b*, 402*c*, 402*d*, 402*e*), a first accommodating channel 404*a* (as shown in FIG. 8), a second accommodating channel (not shown), a third accommodating channel 404*c* (as shown in FIG. 6), a fourth accommodating channel (not shown) and a fifth accommodating channel (not shown), and the accommodating cavity 402*a* is in communication with the first accommodating channel 404*a*, and the accommodating cavity 402*b* is in communication with the second accommodating channel, and the accommodating cavity 402*c* is in communication with the third accommodating channel 404*c*, and the accommodating cavity 402*d* is in communication with the fourth accommodating channel, and the accommodating cavity 402*e* is in communication with the fifth accommodating channel, and each accommodating cavity is configured to accommodate one connecting terminal 100. As shown in FIG. 1-FIG. 3 and FIG. 6, each connecting terminal 100 comprises a body 102, a clip portion 104 and a fixing part 106, and the clip portion 104 comprises a first clip portion 104*a* and a second clip portion 104*b*, and the first clip portion 104*a* and the second clip portion 104*b* are oppositely curled inward from the both sides of the body 102 respectively, for example, by enclosing an approximate "O" shape or "M" shape among the first clip portion 104*a*, the second clip portion 104*b* and the body 102, and the first clip portion 104*a* cooperates with the second clip portion 104*b* to hold a conductor 2020*a* of a wire 200*a*; the fixing part 106 extends from both sides of the body 102, and the fixing part 106 comprises a clamping part 1060 and a stopping part 1062, and the stopping part 1062 is formed on the clamping part 1060, and in particular, in the embodiment shown in FIG. 1-FIG. 3, the clamping part 1060 comprises a first sub-clamping part 1060*a* and a second sub-clamping part 1060*b*, and the stopping part 1062 comprises a first sub-stopping part 1062*a* and a second sub-stopping part 1062*b*, and the first sub-stopping part 1062*a* and the second sub-stopping part 1062*b* are respectively formed on the first sub-clamping part 1060*a* and the second sub-clamping part 1060*b*, and an "M" shape is formed among the first sub-stopping part 1062*a*, the first sub-clamping part 1060*a*, the second sub-stopping part 1062*b* and the second sub-clamping part 1060*b*, and the clamping part 1060 clamps an insulating layer 2022*b* of the wire 200*a* in a way that the first sub-clamping part 1060*a* cooperates with the second sub-clamping part 1060*b*, and the stopping part 1062 is configured to abut the terminal position assurance device 500 to make the connecting terminal 100 fixed in the housing 400 when the connecting terminal 100 is mounted in the housing 400 of the connecting assembly 300. It should be understood that, in another embodiment, an approximate "O" shape is enclosed by the first sub-clamping part 1060*a*, the second sub-clamping part 1060*b* and the body 102, and the first sub-stopping part 1062*a* and the second sub-stopping part 1062*b* extends upwardly respectively from an end of the first sub-clamping part 1060*a* and an end of the second sub-clamping part 1060*b* along a direction away from the body 102. In another embodiment, the stopping part 1062 may merely comprise either of the first sub-stopping part 1062*a* and the second sub-stopping part 1062*b*. In another embodiment, other suitable shapes are enclosed by the first clip portion 104*a*, the second clip portion 104*b* and the body 102.

As shown in FIG. 7-FIG. 10, the connecting assembly 300 mates with a mating connection assembly 700, and the mating connection assembly 700 comprises a mating housing 702 and mating terminals (600*a*, 600*b*, 600*c*, 600*d*, 600*e*), and the mating housing 702 comprises a mating accommodation cavity 702*a* used to accommodate the housing 400, and accommodating channels 704*a*, 704*b*, 704*c*, 704*d*, and 704*e* that are respectively used to accommodate mating terminals 600*a*, 600*b*, 600*c*, 600*d* and 600*e*, are disposed on the mating housing 702, and each of accommodating channels 704*a*, 704*b*, 704*c*, 704*d*, and 704*e* is in communication with the mating accommodation cavity 702*a*. Continuing with FIG. 1-3, FIG. 6 and FIG. 8 shown, each connecting terminal 100 further comprises one mating terminal connection part 108, and the mating terminal connection part 108 is configured to accommodate the mating terminal and electrically connect the mating terminal with the wire, and in specific, after the connecting assembly 300 is assembled with the mating connection assembly 700, separate mating terminal connection parts 108 of five connecting terminals 100 respectively accommodate mating terminals 600*a*, 600*b*, 600*c*, 600*d* and 600*e*, and electrically connect the connecting terminal 600*a* with the wire 200*a*, and electrically connect the connecting terminal 600*b* with the wire 200*b*, and electrically connect the connecting terminal 600*c* with the wire 200*c*, and electrically connect the connecting terminal 600*d* with the wire 200*d*, and electrically connect the connecting terminal 600*e* with the wire 200*e*.

Continuing with FIG. 1 shown, there is a height difference H between at least one of the top of the first stopping part 1062*a* and the top of the second stopping part 1062*a* with the insulating layer 2002*b* of the wire 200*a*, to make the connecting terminal 100 abut the terminal position assurance device 500 when the connecting terminal 100 is mounted in the housing 400, and preferably, the height difference H is between 0.2 mm and 0.6 mm, and more preferably, the height difference H is between 0.3 mm and 0.8 mm.

It should be understood that in other embodiments the housing 500 may comprise one accommodating cavity, two accommodating cavities or any number of accommodating cavities, to accommodate one connecting terminal, two connecting terminals or any number of connecting terminals, and in this case, the mating housing 700 is adaptively adjusted to mate with the housing 500, though the housing 500 comprises five accommodating cavities in the embodiment shown in drawings. In another embodiment, the connecting assembly 300 further comprises the same number of the mating terminals as the number of the connecting terminals accommodated. In another embodiment, the connecting assembly 300 comprises the mating assembly 700.

Since the fixing part has both a clamping part for clamping the wire and a stopping part forming an appropriate height difference with the wire, the connecting terminal provided by the present invention makes products more compact and miniaturized.

It should be noted that, the examples cited above are only specific embodiments of the present invention, and clearly, the present invention is not limited to the above embodiments, and there are many similar variations therewith. For those skilled in the art, all variations directly derived or occurred from the disclosure of the present invention are intended to be within the scope of the present invention.

What is claimed is:

1. A connecting terminal for connecting a wire, comprising:

a body;

a clip portion extending from both sides of the body and configured to hold a conductor of the wire; and a fixing part extending from both sides of the body, comprising:

a clamping part configured to clamp an insulating layer of the wire; and a stopping part formed on the clamping part and configured to abut a terminal position assurance device to fix the connecting terminal in a housing of a connecting assembly when the connecting terminal is mounted in the housing.

2. The connecting terminal of claim 1, wherein the clamping part comprises a first sub-clamping part and a second sub-clamping part that extend respectively from both sides of the body, the stopping part comprises a first sub-stopping part and a second sub-stopping part that are oppositely curled inward from the first sub-clamping part and the second sub-clamping part respectively.

3. The connecting terminal of claim 1, wherein there is a height difference between the top of the stopping part and the top of the insulating layer.

4. The connecting terminal of claim 1, wherein the height difference is between 0.2 mm and 0.6 mm.

5. The connecting terminal of claim 1, wherein the height difference is between 0.3 mm and 0.8 mm.

6. The connecting terminal of claim 1, further comprising a mating terminal connection part that is configured to accommodate a mating terminal and electrically connect the mating terminal with the conductor.

7. The connecting terminal of claim 1, wherein the clip portion comprises a first clip portion and a second clip portion that are oppositely curled inward from both sides of the body.

8. A connecting assembly, comprising:

a terminal position assurance device;

a connecting terminal, having:

a body;

a clip portion extending from both sides of the body and configured to hold a conductor of a wire; and a fixing part extending from both sides of the body, having:

a clamping part configured to clamp an insulating layer of the wire; and a stopping part formed on the clamping part; and a housing having:

an accommodating cavity which is configured to accommodate the connecting terminal; and an accommodating channel, being in communication with the accommodating cavity, and configured to allow a mating terminal to extend therethrough and mate with the connecting terminal in the accommodating cavity;

wherein the terminal position assurance device is capable of abutting the stopping part of the connecting terminal to cause the connecting terminal to be fixed in the housing when the connecting assembly is assembled.

9. The connecting assembly of claim 8, wherein the clamping part comprises a first sub-clamping part and a second sub-clamping part that extend respectively from both sides of the body, the stopping part comprises a first sub-stopping part and a second sub-stopping part that are oppositely curled inward from the first sub-clamping part and the second sub-clamping part respectively.

10. The connecting assembly of claim 8, wherein there is a height difference between the top of the stopping part and the top of the insulating layer.

11. The connecting assembly of claim 8, wherein the height difference is between 0.2 mm and 0.6 mm.

12. The connecting assembly of claim 8, wherein the height difference is between 0.3 mm and 0.8 mm.

13. The connecting assembly of claim 8, wherein the connecting terminal further comprises a mating terminal connection part which is configured to accommodate a respective mating terminal and electrically connect the respective mating terminal with a respective conductor.

14. The connecting assembly of claim 13, wherein the mating terminal corresponds to the connecting terminal.

15. The connecting assembly of claim 13, further comprising a mating connection assembly which comprises a mating housing and the mating terminal accommodated in the mating housing, the mating housing mating with the housing.

16. The connecting assembly of claim 8, wherein the clip portion comprises a first clip portion and a second clip portion that are oppositely curled inward from both sides of the body.

17. The connecting terminal of claim 2, wherein the first sub-stopping part and the second sub-stopping part are oppositely curled inward and have an end contacting the wire.

18. The connecting terminal of claim 2, wherein an M shape is formed between the first sub-stopping part and the second sub-stopping part.

19. The connecting terminal of claim 18, wherein another M shape is formed between the first sub-clamping part and the second sub-clamping part.

* * * * *